US006745147B2

(12) United States Patent
Ahrens, Jr. et al.

(10) Patent No.: US 6,745,147 B2
(45) Date of Patent: Jun. 1, 2004

(54) DATA PROCESSING SYSTEM, METHOD, AND PRODUCT FOR AUTOMATICALLY TRACKING INSERTIONS OF INTEGRATED CIRCUIT DEVICES

(75) Inventors: George Henry Ahrens, Jr., Pflugerville, TX (US); Susan L. Caunt, Georgetown, TX (US); Alongkorn Kitamorn, Austin, TX (US); Leo C. Mooney, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 09/971,144

(22) Filed: Oct. 4, 2001

(65) Prior Publication Data

US 2003/0069711 A1 Apr. 10, 2003

(51) Int. Cl.[7] .............................................. G06F 15/00
(52) U.S. Cl. ........................ 702/127; 714/100; 711/200; 711/219
(58) Field of Search .................... 702/127; 714/718, 714/719, 724, 726, 727, 729, 100, 10; 711/100, 109, 219

(56) References Cited

U.S. PATENT DOCUMENTS 5,761,697 A * 6/1998 Curry et al. ................. 711/100
6,122,704 A * 9/2000 Hass et al. .................. 711/100
6,330,977 B1 * 12/2001 Hass et al. .................. 235/487

FOREIGN PATENT DOCUMENTS

JP 63100587 * 5/1988
JP 4310193 * 11/1992

* cited by examiner

Primary Examiner—John Barlow
Assistant Examiner—Hien Vo
(74) Attorney, Agent, or Firm—Duke W. Yee; Mark E. McBurney; Lisa L. B. Yociss (57) ABSTRACT

A data processing system, method, and computer program product for automatically tracking insertions of integrated circuit devices into receptacle devices. An insertion of an integrated circuit device is automatically detected utilizing the data processing system. An insertion count that is associated with the integrated circuit device is automatically incremented in response to a detection of an insertion of the integrated circuit device. The insertion count is used to track insertions of the integrated circuit device.

32 Claims, 5 Drawing Sheets

| MCM ASSEMBLY NAME | LOCATION CODE | NUMBER OF TIMES INSERTED | | OTHER FILEDS |
|---|---|---|---|---|
| PROCESSOR 1-8 | U1.3-P1-C1 | 2 | | |
| PROCESSOR 9-16 | U1.3-P1-C2 | 7 | | |
| MCM ASSEMBLY NAME | LOCATION CODE | NUMBER OF TIMES INSERTED | FAULT | OTHER FILEDS |
| L3 MODULE 1 | U1.3-P1-C5 | 3 | 0 | |
| L3 MODULE 15 | U1.3-P1-C19 | 10 | 1 | |
| L3 MODULE 16 | U1.3-P1-C19 | 1 | 0 | |

DATA PROCESSING SYSTEM, METHOD, AND PRODUCT FOR AUTOMATICALLY TRACKING INSERTIONS OF INTEGRATED CIRCUIT DEVICES

BACKGROUND OF THE INVENTION

1. Technical Field

The present invention relates generally to the field of integrated circuits, and more specifically to a data processing system for automatically tracking the number of insertions of integrated circuit devices into a receptacle device.

2. Description of Related Art

It may be necessary to track the number of times an integrated circuit device is inserted into a receptacle device in order to reduce hardware errors. For example, if an integrated circuit device is inserted more than a particular number of times, the pins and contacts may become worn or dirty, thus, reducing the reliability of the device.

One type of integrated circuit device which suffers from this problem is a multi-chip module (MCM), as well as the interposer device into which the multi-chip module may be inserted. An interposer device is a socket-like device which may be inserted on printed circuit board, such as a planar, and which also receives an MCM. An MCM coupled to an interposer is referred to hereinafter as an MCM assembly. The pins and contacts of an MCM may become dirty and worn after multiple insertions of the MCM into an interposer, and the pins and contacts of the interposer itself may become dirty and worn after multiple insertions of the interposer into a planar.

The receptacle device may be a printed circuit board, such as a planar, a socket, an interposer, or any other receptacle device.

When a preset threshold number of insertions is reached for an IC device such as an MCM, MCM assembly, or interposer, the IC device is returned for repair or replacement.

Previously, technicians have had to manually track the number of insertions of an integrated circuit device. This process is time-consuming and may produce incorrect data. The number of insertions may be forgotten, lost, or inaccurate.

Therefore, a need exists for a data processing system, method, and product for automatically and accurately tracking the number of insertions of integrated circuit devices into a receptacle device.

SUMMARY OF THE INVENTION

A data processing system, method, and computer program product are disclosed for automatically tracking insertions of integrated circuit devices into receptacle devices. An insertion of an integrated circuit device is automatically detected utilizing the data processing system. An insertion count that is associated with the integrated circuit device is automatically incremented in response to a detection of an insertion of the integrated circuit device. The insertion count is used to track insertions of the integrated circuit device.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is a method, system, and product for automatically tracking the number of insertions of integrated circuit devices into a receptacle device. More specifically, the integrated circuit devices may be multi-chip modules (MCMs), interposer devices, MCM assemblies including MCMs coupled to interposer devices, or any other type of integrated circuit device.

The present invention is implemented by assigning one of the pins of the integrated circuit (IC) device to be a presence detect pin. The data processing system, including the integrated circuit device whose insertions are to be tracked, may poll each receptacle location where such an IC device should be present. If an IC device is inserted in the location, the presence detect pin will indicate the IC's presence. An insertion occurs when a determination is made that no IC device is present at a particular location, and then determining that an IC device is again present at that location.

The present invention provides for several new fields to be added to the vital product data (VPD) that is already maintained for a device. The vital product data is information about a device such as the device's part number, serial number, and other information about the device. The vital product data may be stored on the device itself, or it may be stored on a card separate from the device. The preferred embodiment describes a system whereby for each processor MCM, a separate vital product data is provided. Thus, each processor MCM has its own, separate VPD card. There is a one-to-one correspondence between processor MCMs and their VPD cards. In addition, there is a single VPD card that contains the vital product data for all of the cache MCMs. Those skilled in the art will recognize that the present invention may also be used in systems where the vital product data is stored on a device itself, or where each cache MCM has its own associated VPD card.

An insertion count field is added to each VPD in which the current number of insertions of the associated IC device is maintained. When a field indicates that a particular IC device has been inserted more than a preset threshold number of insertions, the IC device is identified and the technician is instructed to return the particular IC device, along with its VPD card, for repair or replacement.

Figure 1:
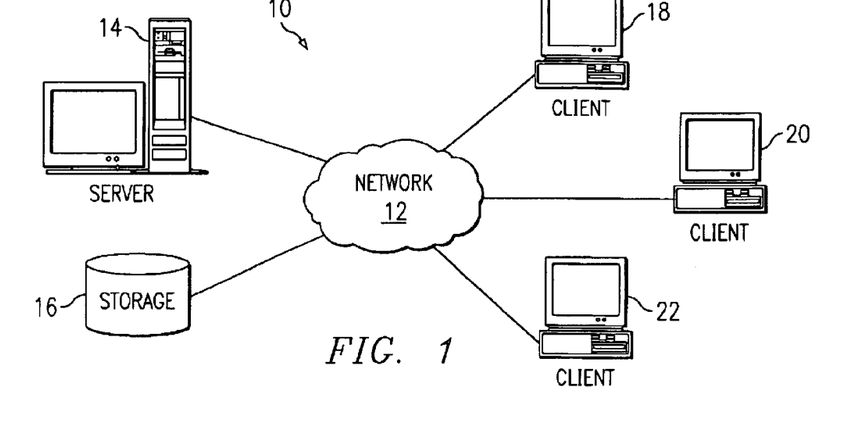
FIG. 1 is a pictorial representation which depicts a data processing system in which the present invention may be implemented in accordance with a preferred embodiment of the present invention.

FIG. 1 depicts a pictorial representation of a network of data processing systems in which the present invention may be implemented. Network data processing system 10 is a network of computers in which the present invention may be implemented. Network data processing system 10 contains a network 12, which is the medium used to provide communications links between various devices and computers connected together within network data processing system 10. Network 12 may include connections, such as wire, wireless communication links, or fiber optic cables.

In the depicted example, a server 14 is connected to network 12 along with storage unit 16. In addition, clients 18, 20, and 22 also are connected to network 12. Network 12 may include permanent connections, such as wire or fiber optic cables, or temporary connections made through telephone connections. The communications network 12 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, a user device may be connected directly to a server 14 without departing from the scope of the present invention. Moreover, as used herein, communications include those enabled by wired or wireless technology.

Clients 18, 20, and 22 may be, for example, personal computers, portable computers, mobile or fixed user stations, workstations, network terminals or servers, cellular telephones, kiosks, dumb terminals, personal digital assistants, two-way pagers, smart phones, information appliances, or network computers. For purposes of this application, a network computer is any computer, coupled to a network, which receives a program or other application from another computer coupled to the network.

In the depicted example, server 14 provides data, such as boot files, operating system images, and applications to clients 18–22. Clients 18, 20, and 22 are clients to server 14. Network data processing system 10 may include additional servers, clients, and other devices not shown. In the depicted example, network data processing system 10 is the Internet with network 12 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 10 also may be implemented as a number of different types of networks, such as for example, an intranet, a local area network (LAN), or a wide area network (WAN). FIG. 1 is intended as an example, and not as an architectural limitation for the present invention.

Figure 2:
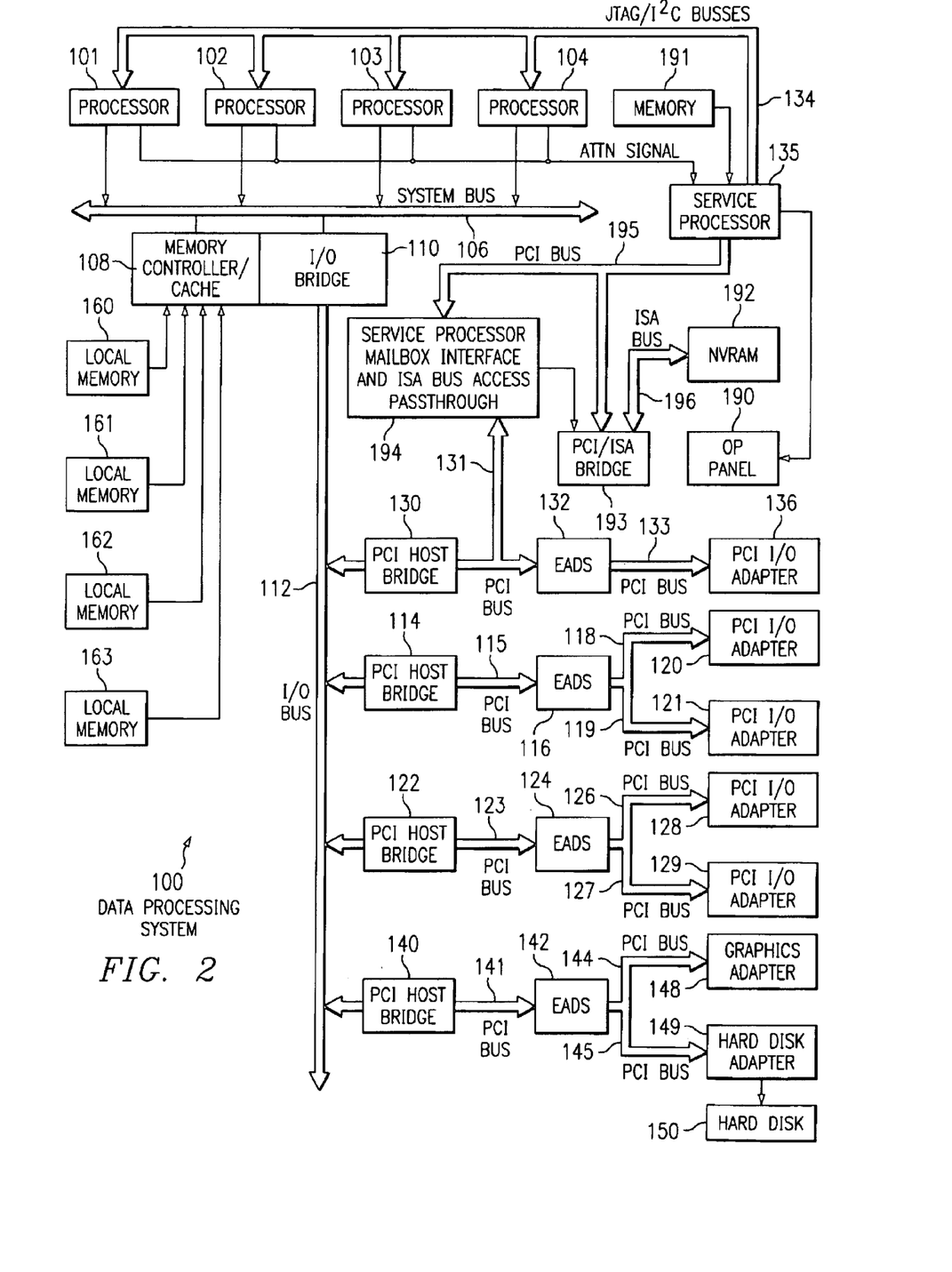
FIG. 2 is a more detailed block diagram of a data processing system in which the present invention may be implemented in accordance with the present invention.

FIG. 2 is a more detailed block diagram of a data processing system in which the present invention may be implemented. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different I/O adapters 120–121, 128–129, 136, and 148–149 may be assigned to different logical partitions.

Thus, for example, suppose data processing system 100 is divided into three logical partitions, P1, P2, and P3. Each of I/O adapters 120–121, 128–129, 136, and 148–149, each of processors 101–104, and each of local memories 160–163 is assigned to one of the three partitions. For example, processor 101, memory 160, and I/O adapters 120, 128, and 129 may be assigned to logical partition P1; processors 102–103, memory 161, and I/O adapters 121 and 136 may be assigned to partition P2; and processor 104, memories 162–163, and I/O adapters 148–149 may be assigned to logical partition P3.

Each operating system executing within data processing system 100 is assigned to a different logical partition. Thus, each operating system executing within data processing system 100 may access only those I/O units that are within its logical partition.

Peripheral component interconnect (PCI) Host bridge 114 connected to I/O bus 112 provides an interface to PCI local bus 115. A number of Input/Output adapters 120–121 may be connected to PCI bus 115. Typical PCI bus implementations will support between four and eight I/O adapters (i.e. expansion slots for add-in connectors). Each I/O Adapter 120–121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128–129 by a PCI bus 126–127. Thus, additional I/O devices, such as, for example, modems or network adapters may be supported through each of PCI I/O adapters 128–129. In this manner, data processing system 100 allows connections to multiple network computers.

A memory mapped graphics adapter 148 may be connected to I/O bus 112 through PCI Host Bridge 140 and EADS 142 (PCI—PCI bridge) via PCI buses 144 and 145 as depicted. Also, a hard disk 150 may also be connected to I/O bus 112 through PCI Host Bridge 140 and EADS 142 via PCI buses 141 and 145 as depicted.

A PCI host bridge 130 provides an interface for a PCI bus 131 to connect to I/O bus 112. PCI bus 131 connects PCI host bridge 130 to the service processor mailbox interface and ISA bus access pass-through logic 194 and EADS 132. The ISA bus access pass-through logic 194 forwards PCI accesses destined to the PCI/ISA bridge 193. The NVRAM storage is connected to the ISA bus 196. The Service processor 135 is coupled to the service processor mailbox interface 194 through its local PCI bus 195. Service processor 135 is also connected to processors 101–104 via a plurality of JTAG/I²C buses 134. JTAG/I²C buses 134 are a combination of JTAG/scan busses (see IEEE 1149.1) and Phillips I²C busses. However, alternatively, JTAG/I²C buses 134 may be replaced by only Phillips I²C busses or only JTAG/scan busses. All SP-ATTN signals of the host processors 101, 102, 103, and 104 are connected together to an interrupt input signal of the service processor. The service processor 135 has its own local memory 191, and has access to the hardware op-panel 190.

When data processing system 100 is initially powered up, service processor 135 uses the JTAG/scan buses 134 to interrogate the system (Host) processors 101–104, memory controller 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the system processors 101–104, memory controller 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (Host) memories 160–163. Service processor 135 then releases the Host processors 101–104 for execution of the code loaded into Host memory 160–163. While the Host processors 101–104 are executing code from respective operating systems within the data processing system 100, service processor 135 enters a mode of monitoring and reporting errors. The type of items monitored by service processor include, for example, the cooling fan speed and operation, thermal sensors, power supply regulators, and recoverable and non-recoverable errors reported by processors 101–104, memories 160–163, and bus-bridge controller 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for reconfiguration during the current running session and future Initial Program Loads (IPLs). IPLs are also sometimes referred to as a "boot" or "bootstrap".

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3:
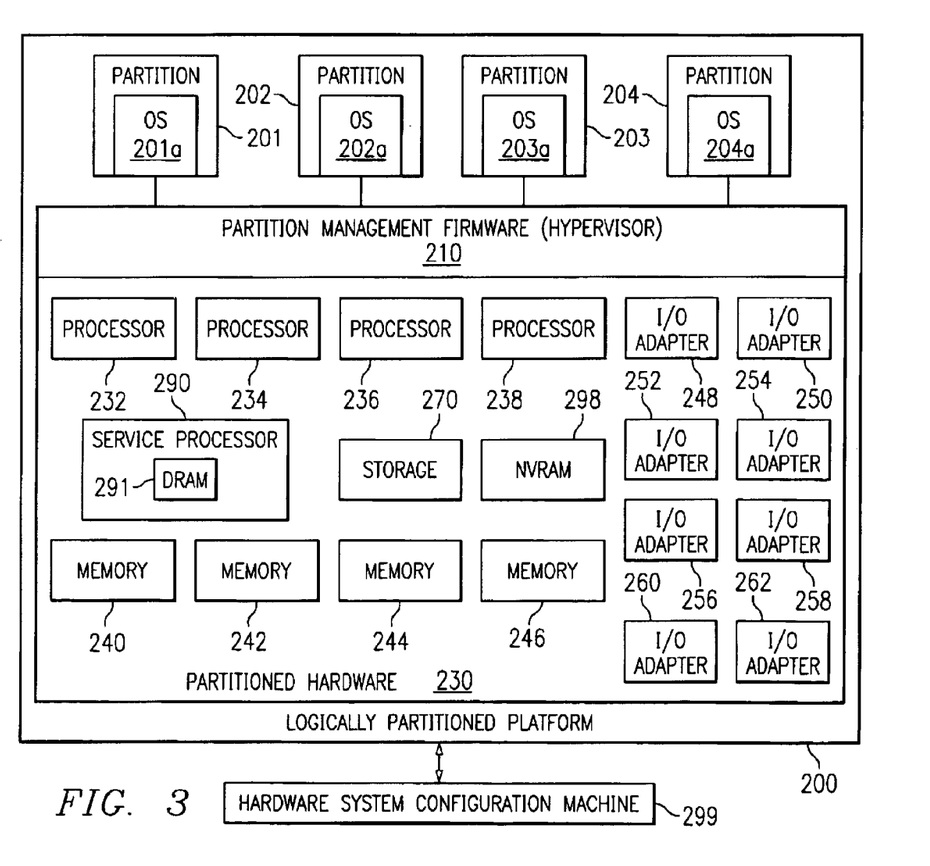
FIG. 3 is a block diagram of an exemplary logically partitioned platform in which the present invention may be implemented.

FIG. 3 is a block diagram of an exemplary logically partitioned platform in which the present invention may be implemented. Logically partitioned platform 200 includes partitioned hardware 230, partition management firmware, also called a hypervisor 210, and partitions 201–204. Operating systems 201a–204a exist within partitions 201–204. Operating systems 201a–204a may be multiple copies of a single operating system or multiple heterogeneous operating systems simultaneously run on platform 200.

Partitioned hardware 230 includes a plurality of processors 232–238, a plurality of system memory units 240–246, a plurality of input/output (I/O) adapters 248–262, and a storage unit 270. Each of the processors 242–248, memory units 240–246, NVRAM storage 298, and I/O adapters 248–262 may be assigned to one of multiple partitions 201–204.

Partitioned hardware 230 also includes service processor 290. A non-volatile memory device 291, such as a DRAM device, is included within service processor 291. The partition tables and firmware images described herein, as well as other information, are stored within service processor memory 291.

Partition management firmware (hypervisor) 210 performs a number of functions and services for partitions 201–204 to create and enforce the partitioning of logically partitioned platform 200. Hypervisor 210 is a firmware implemented virtual machine identical to the underlying hardware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 210 allows the simultaneous execution of independent OS images 201a–204a by virtualizing all the hardware resources of logically partitioned platform 200. Hypervisor 210 may attach I/O devices through I/O adapters 248–262 to single virtual machines in an exclusive mode for use by one of OS images 201a–204a.

A hardware system configuration (HSC) machine 299 may be coupled to data processing system 100 which includes logically partitioned platform 200. HSC 299 is a separate computer system that is coupled to service processor 290 and may be used by a user to control various functions of data processing system 100 through service processor 290. HSC 299 includes a graphical user interface (GUI) which may be used by a user to select a partition to be rebooted. Further, a listing of different firmware images that are stored within service processor memory 291 may be presented to the user utilizing the graphical user interface of HSC 299. The user may then select one of the listed firmware images to use to boot the selected partition as described below.

When a user selects a partition, HSC 299 transmits a request to service processor 290 to have service processor 290 update the partition table associated with the selected partition. Service processor 290 updates the partition table by setting an indicator within the table to indicate that the associated partition needs to be rebooted. In addition, HSC 299 transmits an identifier to service processor 290 which identifies the particular firmware image selected by the user. Service processor 290 then stores this identifier within the partition table associated with the selected partition. As described in more detail below, hypervisor 210 routinely checks each partition table to determine a current state of the indicator stored in each table. When hypervisor 210 finds an indicator that indicates a partition needs to be rebooted, hypervisor 210 copies the firmware image identified within that partition table to the logical memory of the partition associated with the partition table. That firmware image is then executed within the partition causing only that partition to be rebooted. Other partitions are unaffected by this process.

Figure 4:
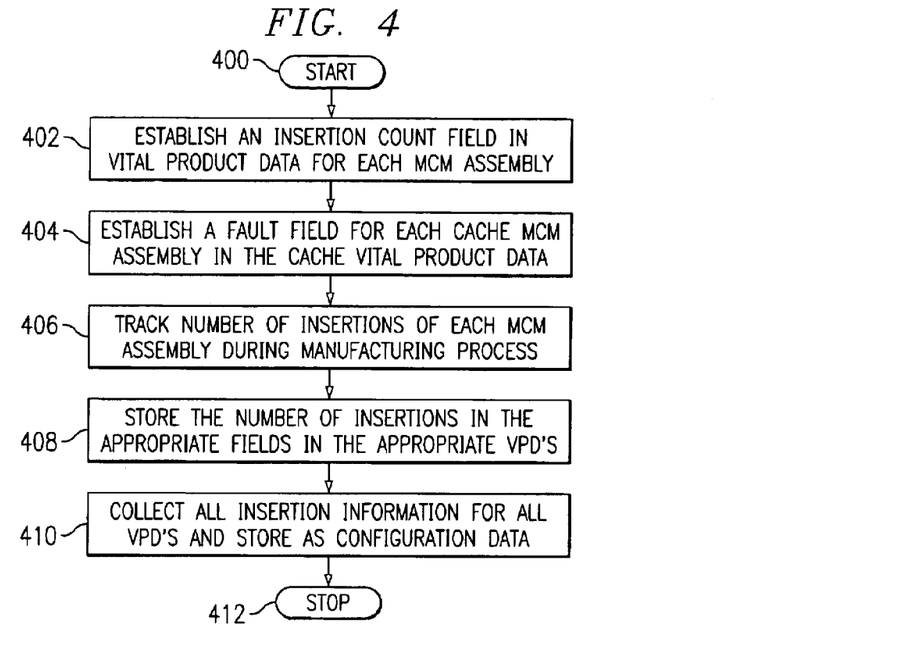
FIG. 4 illustrates a high level flow chart which depicts establishing insertion count fields within the vital product data for tracking the number of insertions of integrated circuit devices and storing configuration data in accordance with the present invention.

FIG. 4 illustrates a high level flow chart which depicts establishing insertion count fields within vital product data for tracking the number of insertions of integrated circuit devices described by the vital product data, and storing configuration data in accordance with the present invention. The process starts as depicted by block 400 and thereafter passes to block 402 which illustrates establishing an insertion count field in each vital product data for each MCM assembly. Next, block 404 depicts establishing a fault field for each cache MCM assembly in the cache vital product data. As described above, a separate VPD card is maintained for each processor MCM assembly. One VPD card is maintained for the cache MCM assemblies. An insertion field is established in each VPD card. In addition, fault fields are established in the cache VPD card for each cache MCM.

Figure 6:
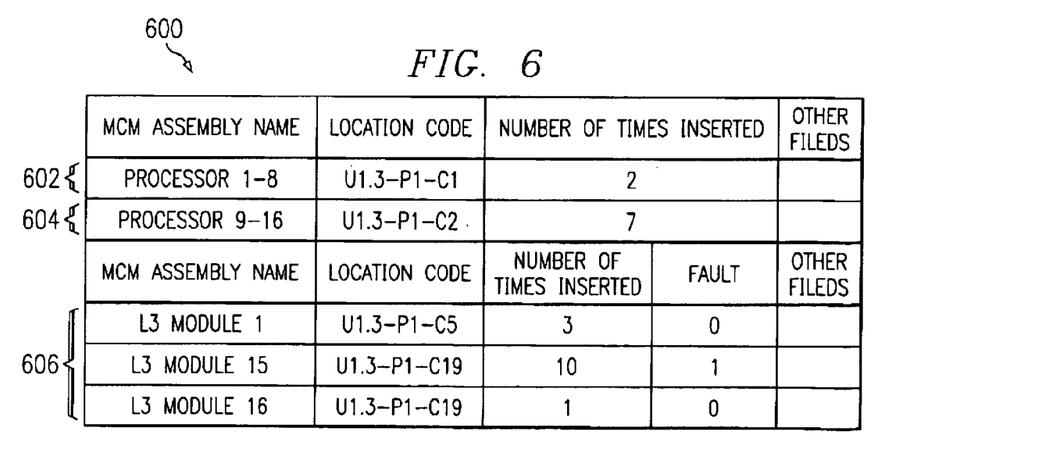
FIG. 6 is a block diagram which depicts configuration data including insertion count and fault fields in accordance with the present invention.

Thereafter, block 406 illustrates tracking the number of insertions of each MCM assembly during the manufacturing process. Block 408, then, depicts storing the number of insertions into the appropriate fields in the appropriate VPD's. Thereafter, block 410 illustrates collecting all insertion information for all VPD's, collecting the fault information, and storing all of this information as configuration data in NVRAM. One example of configuration data that might be collected and stored is depicted by FIG. 6. The process then terminates as depicted by block 412.

Figure 5A:
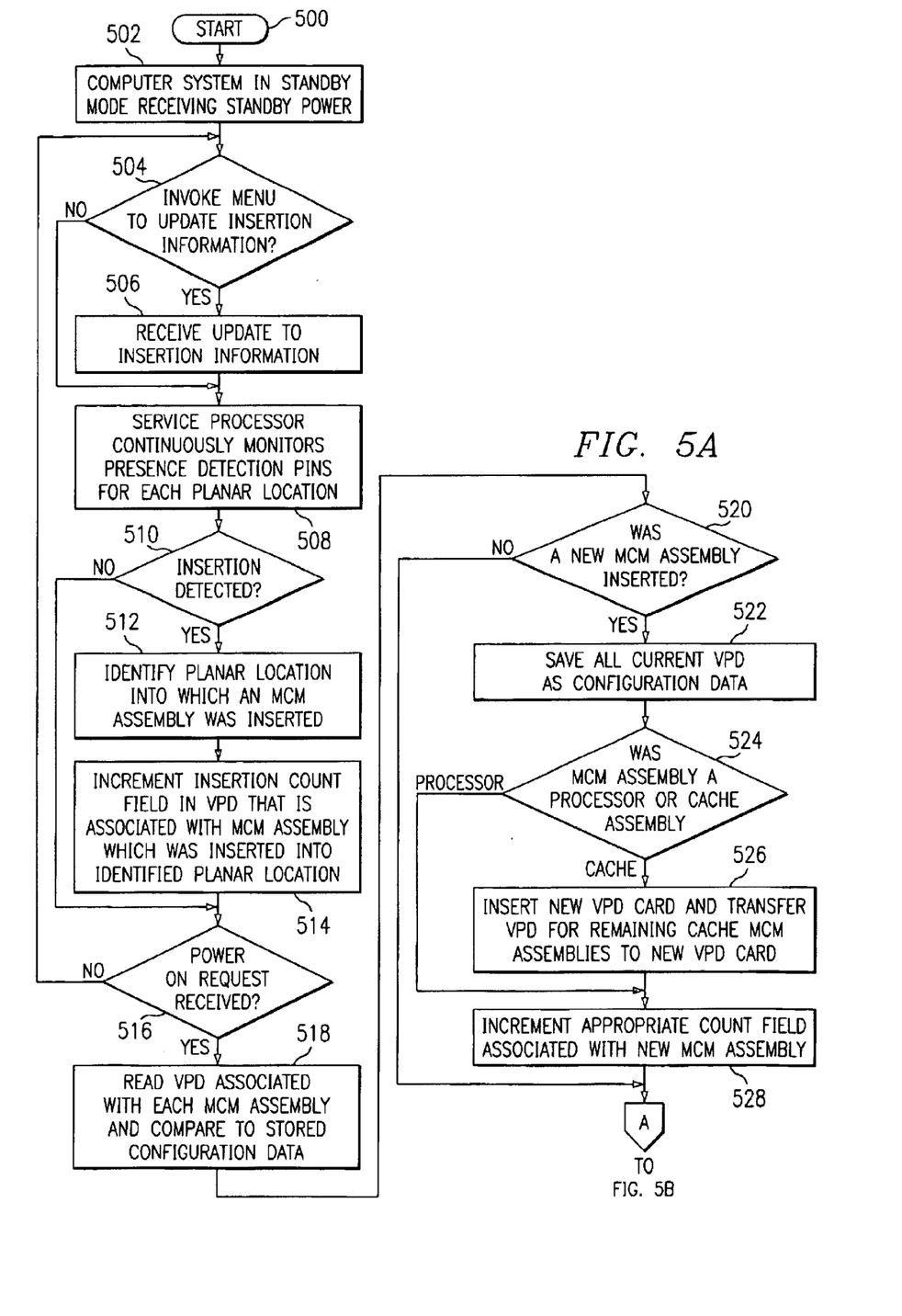
FIGS. 5A–5B depict a high level flow chart which illustrates tracking the number of insertions of integrated circuit devices in accordance with the present invention.
Figure 5B:
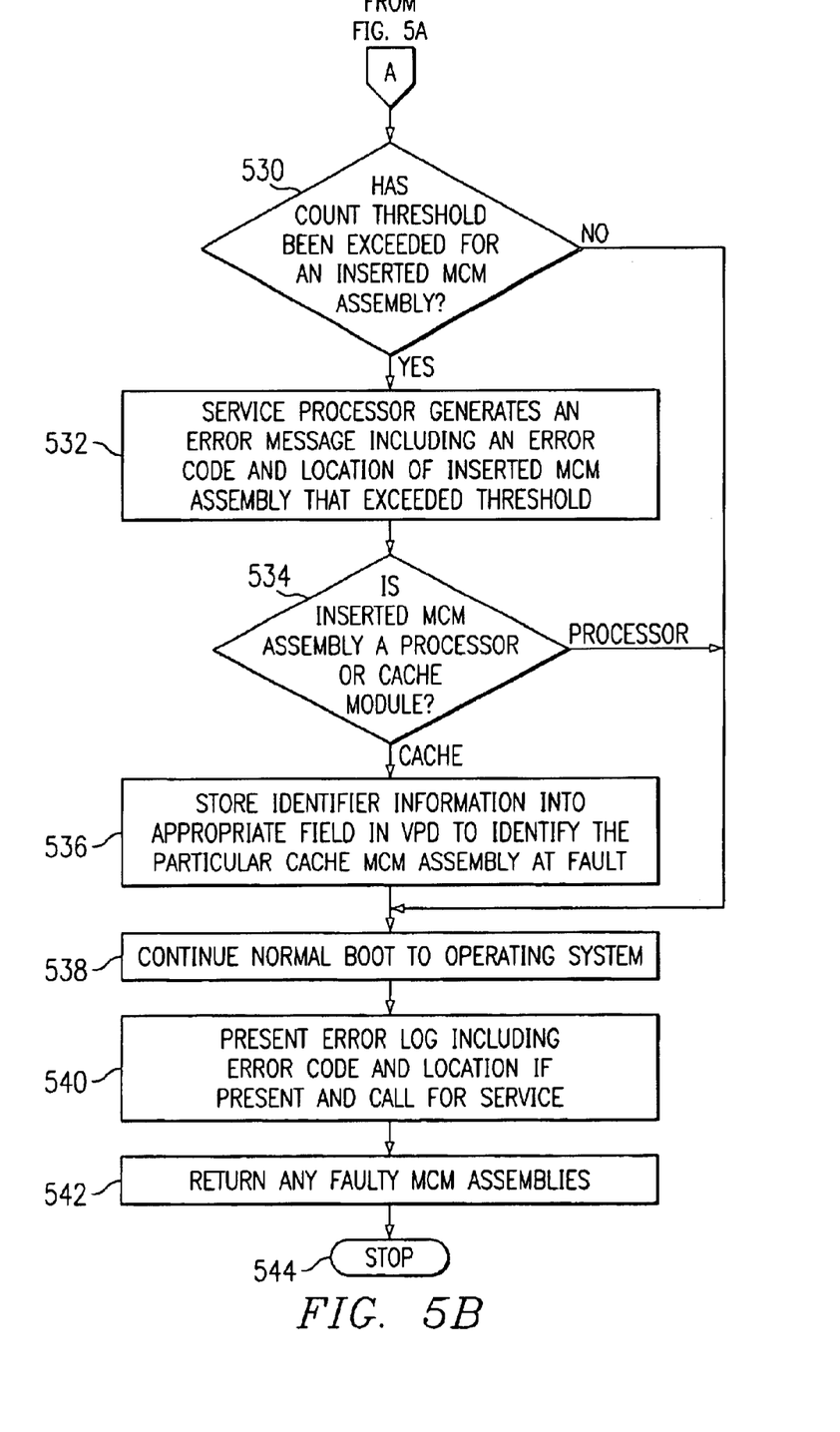

FIGS. 5A–5B depict a high level flow chart which illustrates tracking the number of insertions of integrated circuit devices in accordance with the present invention. The process starts as depicted by block 500 and thereafter passes to block 502 which illustrates the computer system being in standby mode whereby the computer system continuously receives standby power. Next, block 504 depicts a determination of whether or not a user has invoked a menu to use to manually update the insertion information. A technician might have inserted an IC device, such as an MCM assembly, while the data processing system was completely powered off. In this case, because there was a lass of standby power, the data processing system could not detect the insertion. This insertion must be entered manually. If a determination is made that a user has invoked a menu to use to manually update the insertion information, the process passes to block 506 which illustrates receiving a manual update to one or more insertion count fields. The process then passes to block 508. Referring again to block 504, if a determination is made that a user has not invoked a menu to use to manually update the insertion information, the process passes to block 508.

Block 508 depicts the service processor continuously monitoring the presence of the presence detect pins for each planar location. The service processor will continuously monitor the presence detect pins while the service processor receives standby power. The process then passes to block 510 which illustrates a determination of whether or not an insertion has been detected. An insertion is detected by first detecting the absence of a presence detect pin, and then detecting the presence of a presence detect pin. If a determination is made that an insertion has not been detected, the process passes to block 516. Referring again to block 510, if a determination is made that an insertion has been detected, the process passes to block 512 which depicts the service processor identifying a planar location into which an MCM assembly was inserted. Next, block 514 illustrates incrementing the insertion count field in the VPD that is associated with the MCM assembly that was inserted into the identified planar location. The process then passes to block 516.

Block 516, then, depicts a determination of whether or not a power-on request has been received. If a determination is made that a power-on request has not been received, the process passes to block 504. Referring again to block 516, if a determination is made that a power-on request has been received, the process passes to block 518. Block 518 illustrates the service processor reading the VPD associated with each MCM assembly and comparing it to the stored configuration data. Next, block 520 depicts a determination of whether or not a new MCM assembly has been inserted. If a determination is made that a new MCM assembly was not inserted, i.e. thus, a determination is made that an MCM assembly was removed and reinserted, the process passes to block 530.

Referring again to block 520, if a determination is made that a new MCM assembly was inserted, the process passes to block 522 which illustrates saving all of the current VPD from each VPD card as configuration data. Next, block 524 depicts a determination of whether the new MCM assembly is a cache or a processor MCM assembly. If a determination is made that the new MCM assembly is a cache assembly, the process passes to block 526 which illustrates inserting a new VPD card into the computer system and transferring the VPD for the remaining cache MCM assemblies to the new VPD card. The process then passes to block 528. Referring again to block 524, if a determination is made that the new MCM assembly is a processor assembly, the process passes to block 528 which illustrates incrementing the appropriate insertion count field in the VPD associated with the new MCM assembly. The process then passes to block 530.

Block 530 depicts a determination of whether or not a count threshold has been exceeded for an inserted MCM assembly. If a determination is made that the count threshold has not been exceeded, the process passes to block 538. Referring again to block 530, if a determination is made that the count threshold has been exceeded, the process passes to block 532 which depicts the service processor generating an error message that includes an insertion error code and the location of the inserted MCM assembly that exceeded the threshold.

The process then passes to block 534 which illustrates a determination of whether the inserted MCM assembly is a processor or cache MCM assembly. If a determination is made that the inserted MCM assembly is a processor MCM assembly, the process passes to block 538. Referring again to block 534, if a determination is made that the inserted MCM assembly is a cache MCM assembly, the process passes to block 536 which depicts storing identifier information into the appropriate field in the cache's VPD to identify the particular cache MCM assembly which exceeded the threshold.

Block 538, then, illustrates continuing a normal boot process to the operating system. Thereafter, block 540 depicts the operating system presenting its error log which may include an error code indicating an MCM assembly which exceeded an insertion count threshold along with the location of the MCM assembly at fault. The operating system then makes a call for service. Next, block 542 illustrates returning any faulty MCM assemblies, along with their associated VPD cards, for replacement or rework. The process then terminates as depicted by block 544.

FIG. 6 is a block diagram which depicts a portion of the configuration data including insertion count and fault fields in accordance with the present invention. This portion is stored as configuration data. An entry is included for each MCM assembly. The configuration data depicted by FIG. 6 includes two processor MCM assemblies and three cache MCM assemblies.

The configuration data 600 is stored in NVRAM and is used by the service processor as describe above in FIGS. 5A–5B, blocks 518 and 520, to determine if a new MCM assembly has been inserted. Configuration data 600 may also be used by the service processor for other purposes.

Each entry of configuration data 600 is also stored in the appropriate VPD. For example, entry 602 is stored in the VPD card associated with MCM assembly named "Processor 1–8". Entry 604 is stored in the VPD card associated with MCM assembly named "Processor 9–16". Entry 606, which includes the three entries for the three cache MCM assemblies, is stored in the VPD card associated with the cache assemblies. One VPD card is used by all of the cache assemblies.

Those skilled in the art will recognize that the present invention may be utilized in a system whereby a different VPD card is associated with each cache MCM assembly. Further, those skilled in the art will also recognize that the present invention may be utilized in a system whereby the VPD is stored on an MCM assembly.

Each entry includes a name field to identify a particular MCM assembly and a location field to identify each MCM assembly's location on the planar.

For processor MCM assemblies, a third field, an insertion count field, is included in which is stored the number of times the particular MCM assembly has been inserted onto the planar. This insertion count includes the total number of times the MCM assembly was inserted, both during manufacturing and in the field.

For cache MCM assemblies, a third and a fourth field are included. The third field is the insertion count field which is utilized in the manner described above for the processor assemblies. The fourth field is a fault field which identifies a particular cache MCM assembly which exceeded the insertion count threshold. As described above, in the embodiment depicted, all cache MCM assemblies share one VPD card. When a cache MCM assembly exceeds the insertion count threshold, the cache MCM assembly and the VPD card associated with the cache MCM assemblies are returned for replacement or rework. The fault field is used to identify the planar location where the cache MCM assembly at fault was located. This information may then be used for statistical or diagnostic purposes.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for automatically tracking insertions of integrated circuit devices into a receptacle device, said method comprising the steps of:

automatically detecting, utilizing said data processing system, an insertion of an integrated circuit device into said receptacle device; and in response to a detection of an insertion of said integrated circuit device into said receptacle device, automatically incrementing an insertion count associated with said integrated circuit device, wherein said insertion count is used to track insertions of said integrated circuit device into said receptacle device.

2. The method according to claim 1, further comprising the step of automatically detecting, utilizing said data processing system, an insertion of an MCM assembly into a planar.

3. The method according to claim 2, further comprising the step of automatically detecting, utilizing said data processing system, an insertion of an interposer into a planar.

4. The method according to claim 1, further comprising the step of automatically detecting, utilizing said data processing system, an insertion of an MCM into an interposer.

5. The method according to claim 1, further comprising the step of automatically detecting, utilizing said data processing system, an insertion of an IC into a printed circuit board.

6. The method according to claim 1, further comprising the A method in a data processing system for automatically tracking insertions of integrated circuit devices into a receptacle device, said method comprising the steps of:

automatically detecting, utilizing said data processing system, an insertion of an integrated circuit device into said receptacle device;

in response to a detection of an insertion of said integrated circuit device into said receptacle device, automatically incrementing an insertion count associated with said integrated circuit device, wherein said insertion count is used to track insertions of said integrated circuit device into said receptacle device;

providing vital product data for said IC device;

establishing an insertion count field within said vital product; and storing within said insertion count field a current number of times said IC device has been inserted into said receptacle.

7. The method according to claim 6, wherein the step of automatically detecting an insertion of an integrated circuit device into said receptacle device further comprises the steps of:

first detecting an absence of an integrated circuit device from said receptacle; and next detecting a presence of an integrated circuit device in said receptacle.

8. The method according to claim 7, further comprising the steps of:

first detecting an absence of a presence detect pin in said receptacle; and next detecting a presence of a presence detect pin in said receptacle.

9. The method according to claim 8, further comprising the step of in response to a detection of a presence detect pin in said receptacle, incrementing an insertion count field associated with an integrated circuit device inserted into said receptacle.

10. The method according to claim 6, further comprising the steps of:
   determining whether said insertion count exceeds an insertion threshold; and
   in response to a determination that said insertion count exceeds said insertion threshold, reporting an error and a location of said integrated circuit device.

11. The method according to claim 10, further comprising the step of returning said integrated circuit device.

12. A data processing system for automatically tracking insertions of integrated circuit devices into a receptacle device, comprising:
   said data processing system for automatically detecting an insertion of an integrated circuit device into said receptacle device; and
   in response to a detection of an insertion of said integrated circuit device into said receptacle device, said data processing system for automatically incrementing an insertion count associated with said integrated circuit device, wherein said insertion count is used to track insertions of said integrated circuit device into said receptacle device.

13. The system according to claim 12, further comprising said data processing system for automatically detecting an insertion of an MCM assembly into a planar.

14. The system according to claim 13, further comprising said data processing system for automatically detecting an insertion of an interposer into a planar.

15. The system according to claim 12, further comprising said data processing system for automatically detecting an insertion of an MCM into an interposer.

16. The system according to claim 12, further comprising said data processing system for automatically detecting an insertion of an IC into a printed circuit board.

17. A data processing system for automatically tracking insertions of integrated circuit devices into a receptacle device, comprising:
   said data processing system for automatically detecting an insertion of an integrated circuit device into said receptacle device;
   in response to a detection of an insertion of said integrated circuit device into said receptacle device, said data processing system for automatically incrementing an insertion count associated with said integrated circuit device, wherein said insertion count is used to track insertions of said integrated circuit device into said receptacle device;
   vital product data provided for said IC device;
   an insertion count field established within said vital product; and
   said data processing system for storing within said insertion count field a current number of times said IC device has been inserted into said receptacle.

18. The system according to claim 17, wherein said data processing system for automatically detecting an insertion of an integrated circuit device into said receptacle device further comprises:
   said data processing system for first detecting an absence of an integrated circuit device from said receptacle; and
   said data processing system for next detecting a presence of an integrated circuit device in said receptacle.

19. The system according to claim 18, further comprising:
   said data processing system for first detecting an absence of a presence detect pin in said receptacle; and
   said data processing system for next detecting a presence of a presence detect pin in said receptacle.

20. The system according to claim 19, further comprising in response to a detection of a presence detect pin in said receptacle, said data processing system for incrementing an insertion count field associated with an integrated circuit device inserted into said receptacle.

21. The system according to claim 17, further comprising:
   said data processing system for determining whether said insertion count exceeds an insertion threshold; and
   in response to a determination that said insertion count exceeds said insertion threshold, said data processing system for reporting an error and a location of said integrated circuit device.

22. The system according to claim 21, further comprising said integrated circuit device being returned.

23. A computer program product in a data processing system for automatically tracking insertions of integrated circuit devices into a receptacle device, said computer program product comprising:
   instruction means for automatically detecting, utilizing said data processing system, an insertion of an integrated circuit device into said receptacle device; and
   in response to a detection of an insertion of said integrated circuit device into said receptacle device, instruction means for automatically incrementing an insertion count associated with said integrated circuit device, wherein said insertion count is used to track insertions of said integrated circuit device into said receptacle device.

24. The product according to claim 23, further comprising instruction means for automatically detecting, utilizing said data processing system, an insertion of an MCM assembly into a planar.

25. The product according to claim 24, further comprising instruction means for automatically detecting, utilizing said data processing system, an insertion of an interposer into a planar.

26. The product according to claim 23, further comprising instruction means for automatically detecting, utilizing said data processing system, an insertion of an MOM into an interposer.

27. The product according to claim 23, further comprising instruction means for automatically detecting, utilizing said data processing system, an insertion of an IC into a printed circuit board.

28. A computer program product in a data processing system for automatically tracking insertions of integrated circuit devices into a receptacle device, said computer program product comprising:
   instruction means for automatically detecting, utilizing said data processing system, an insertion of an integrated circuit device into said receptacle device;
   in response to a detection of an insertion of said integrated circuit device into said receptacle device, instruction means for automatically incrementing an insertion count associated with said integrated circuit device, wherein said insertion count is used to track insertions of said integrated circuit device into said receptacle device;
   instruction means for providing vital product data for said IC device;
   instruction means for establishing an insertion count field within said vital product; and
   instruction means for storing within said insertion count field a current number of times said IC device has been inserted into said receptacle.

29. The product according to claim 28, wherein said instruction means for automatically detecting an insertion of an integrated circuit device into said receptacle device further comprises:
- instruction means for first detecting an absence of an integrated circuit device from said receptacle; and
- instruction means for next detecting a presence of an integrated circuit device in said receptacle.

30. The product according to claim 29, further comprising:
- instruction means for first detecting an absence of a presence detect pin in said receptacle; and
- instruction means for next detecting a presence of a presence detect pin in said receptacle.

31. The product according to claim 30, further comprising in response to a detection of a presence detect pin in said receptacle, instruction means for incrementing an insertion count field associated with an integrated circuit device inserted into said receptacle.

32. The product according to claim 28, further comprising:
- instruction means for determining whether said insertion count exceeds an insertion threshold; and
- in response to a determination that said insertion count exceeds said insertion threshold, instruction means for reporting an error and a location of said integrated circuit device.

* * * * *